Figure 12:
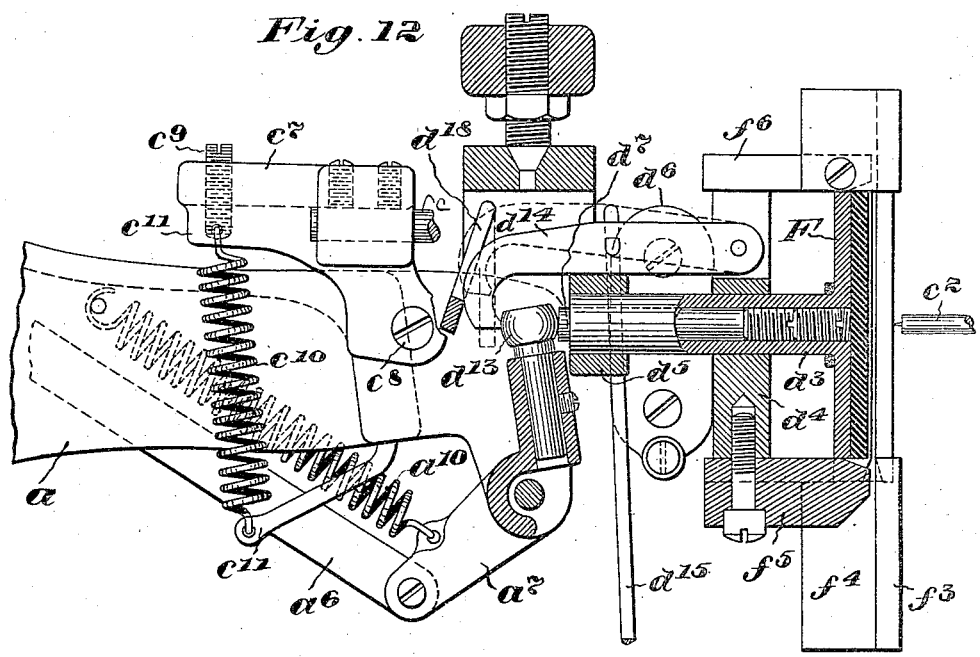

H. H. CUMMINGS.
TARGET PRACTICE APPARATUS.
APPLICATION FILED JULY 29, 1904.
936,419.
Patented Oct. 12, 1909.
6 SHEETS—SHEET 1.
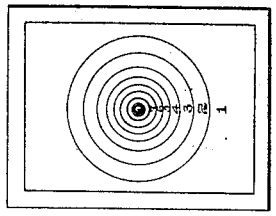
Fig. 2
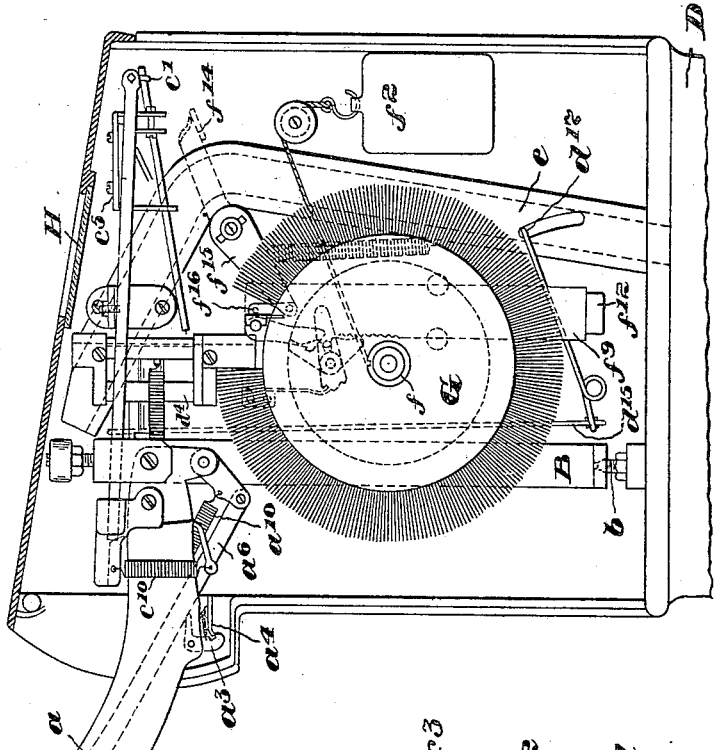
Fig. 1
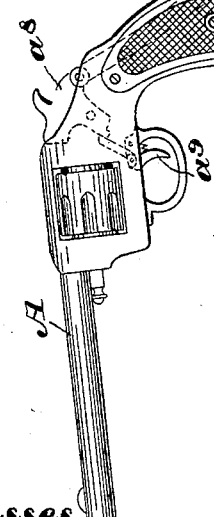
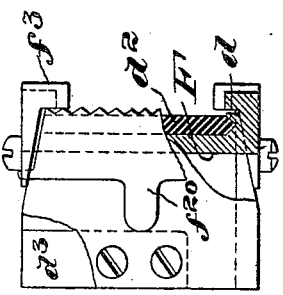
Fig. 3
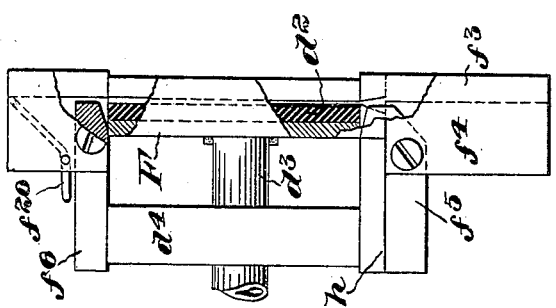
Fig. 4
Witnesses
Horace A. Crossman
Everett S. Emery
Inventor:
Henry H. Cummings
by Emery, Booth & Powell
Attys.

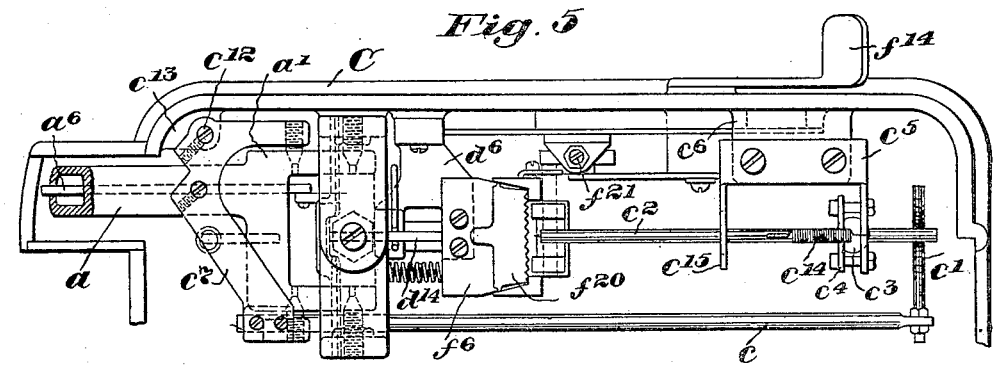

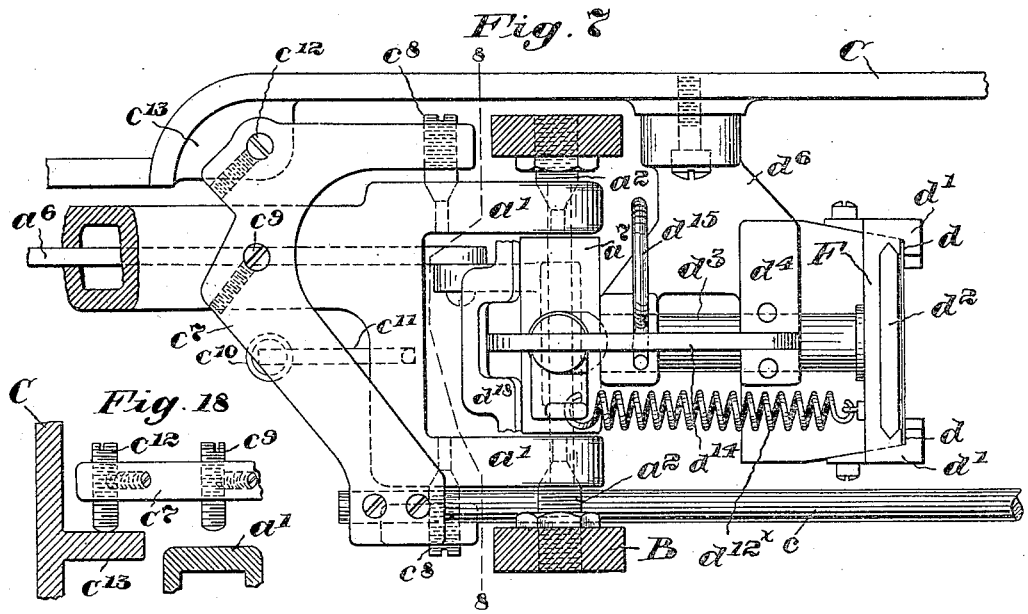
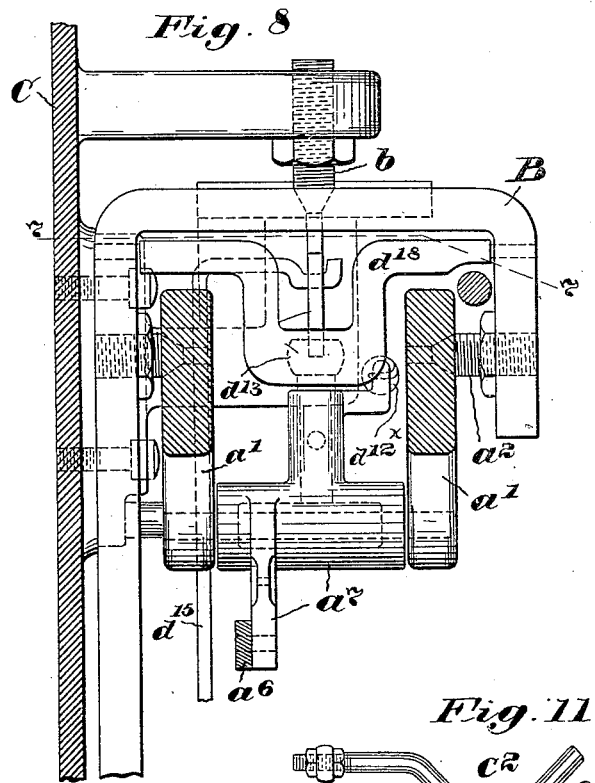
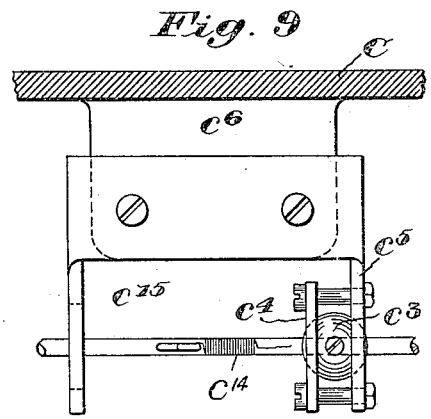
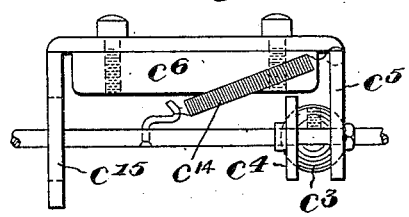

H. H. CUMMINGS.
TARGET PRACTICE APPARATUS.
APPLICATION FILED JULY 29, 1904.

936,419.

Patented Oct. 12, 1909.
6 SHEETS—SHEET 4.

Witnesses:
Horace A. Crosman
Everitt S. Emery

Inventor:
Henry H. Cummings
by Emery, Booth & Powell
Attys.

H. H. CUMMINGS.
TARGET PRACTICE APPARATUS.
APPLICATION FILED JULY 29, 1904.
936,419.
Patented Oct. 12, 1909.
6 SHEETS—SHEET 5.
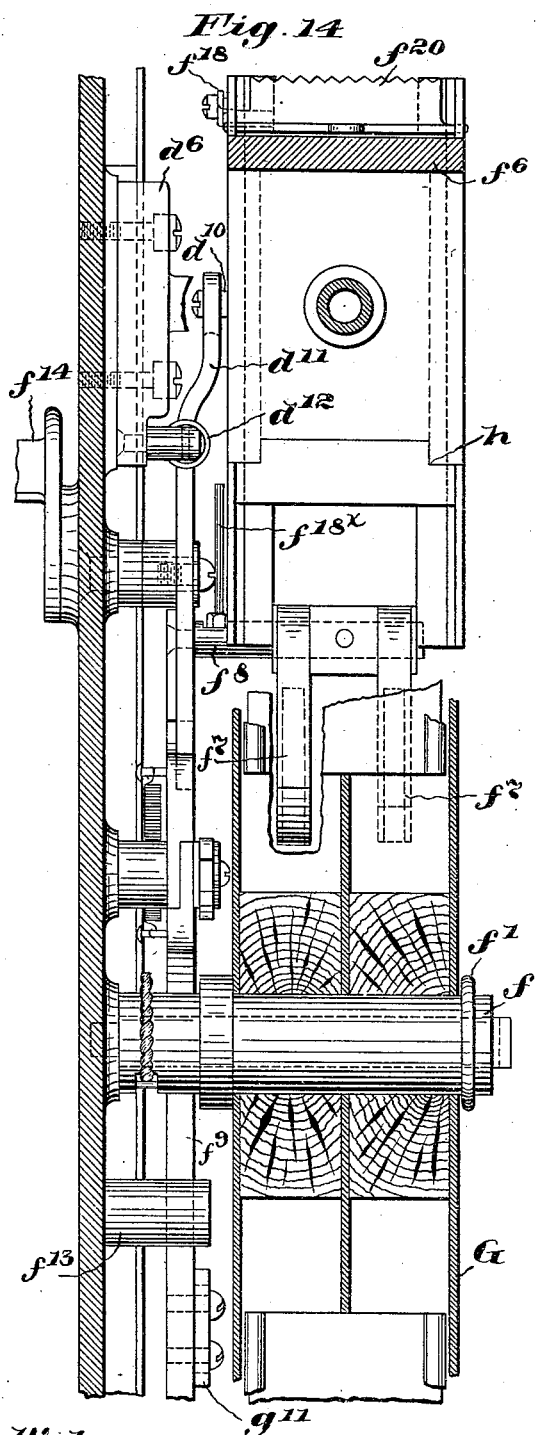
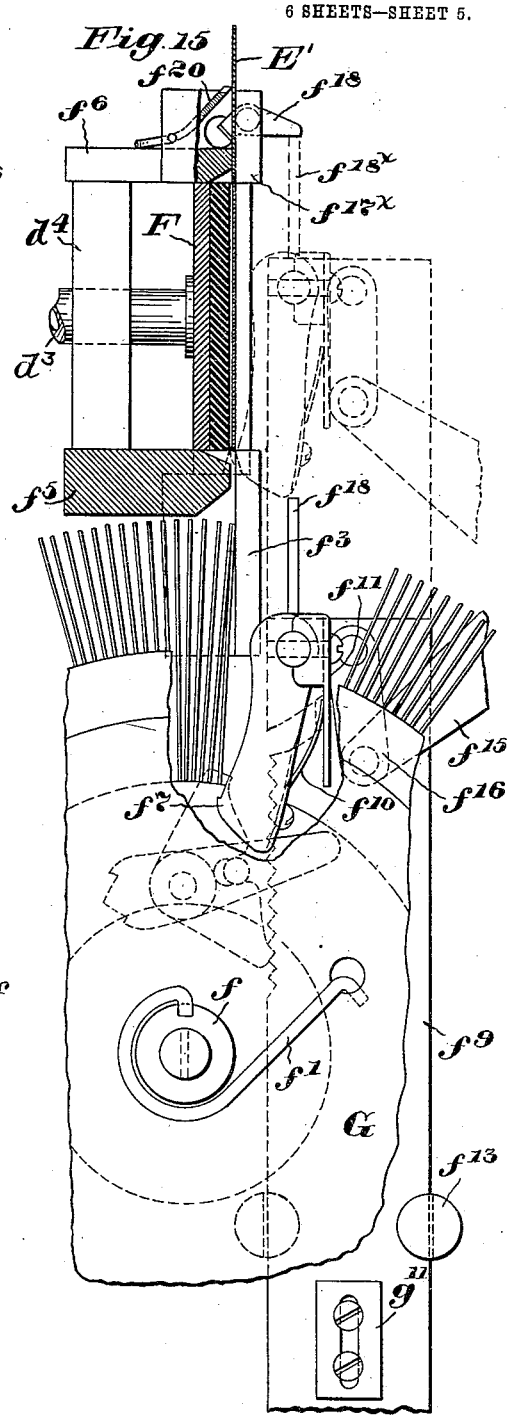
Witnesses:
Horace A. Crosman.
Everett S. Emery
Inventor:
Henry H. Cummings
by Emery, Booth, Powell
Attys.

H. H. CUMMINGS.
TARGET PRACTICE APPARATUS.
APPLICATION FILED JULY 29, 1904.

936,419.

Patented Oct. 12, 1909.
6 SHEETS—SHEET 6.

Witnesses.
Horace A. Crossman
Everitt S. Emery

Inventor:
Henry H. Cummings.
by Emery, Booth & Powell.
Attys.

UNITED STATES PATENT OFFICE.

HENRY H. CUMMINGS, OF MALDEN, MASSACHUSETTS, ASSIGNOR TO SUB-TARGET GUN COMPANY, OF BOSTON, MASSACHUSETTS, A CORPORATION OF MAINE.

TARGET-PRACTICE APPARATUS.

936,419.  Specification of Letters Patent.  Patented Oct. 12, 1909.

Application filed July 29, 1904. Serial No. 218,649.

*To all whom it may concern:*

Be it known that I, HENRY H. CUMMINGS, a citizen of the United States, residing at Malden, in the county of Middlesex and State of Massachusetts, have invented an Improvement in Target-Practice Apparatus, of which the following description, in connection with the accompanying drawings, is a specification, like letters on the drawings representing like parts.

My invention consists in improvements in target practice apparatus, being particularly but not exclusively concerned with coin controlled devices for permitting the practice of marksmanship.

I have herein illustrated and described one form of my invention as applied to a device intended for the practice of marksmanship, wherein is employed an aiming device so mounted as to be capable of an aiming movement with reference to a main target and provided with a suitable follower to follow the aiming movement thereof, and also with suitable recording devices to record the position of the follower upon a sub- or miniature target at the time of simulated firing, the object therein being the accurate record of the aim upon the sub-target without the issuance of any projectile from the aiming device. I have also herein described suitable coin controlled mechanism to permit the movement of the aiming device and the record of the aim thereof only upon the insertion of a coin or other suitable operating member; also suitable target feeding devices for ejecting the marked sub-target from the apparatus and delivering the same within the grasp of the marksman, and for placing a fresh sub-target from a target magazine in recording position ready for another record or shot.

My invention will be best understood from the following description, taken in connection with the accompanying drawings of the one specific embodiment which is herein selected for illustrative purposes only, while its scope will be more particularly pointed out in the appended claims.

Figure 13:
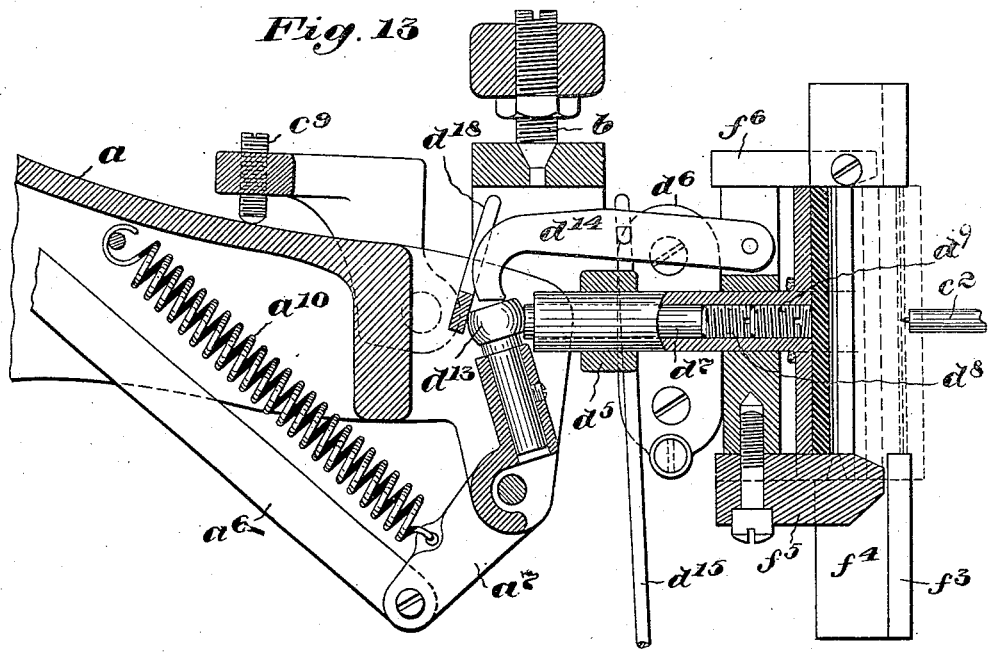
Figure 16:
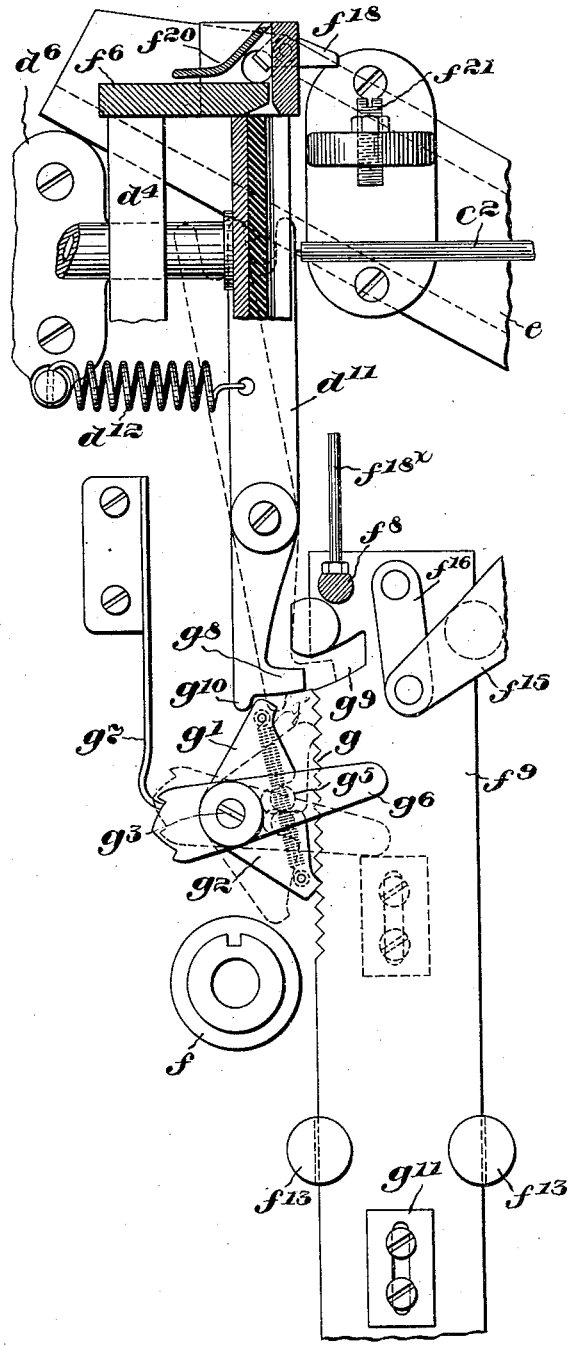
Figure 17:
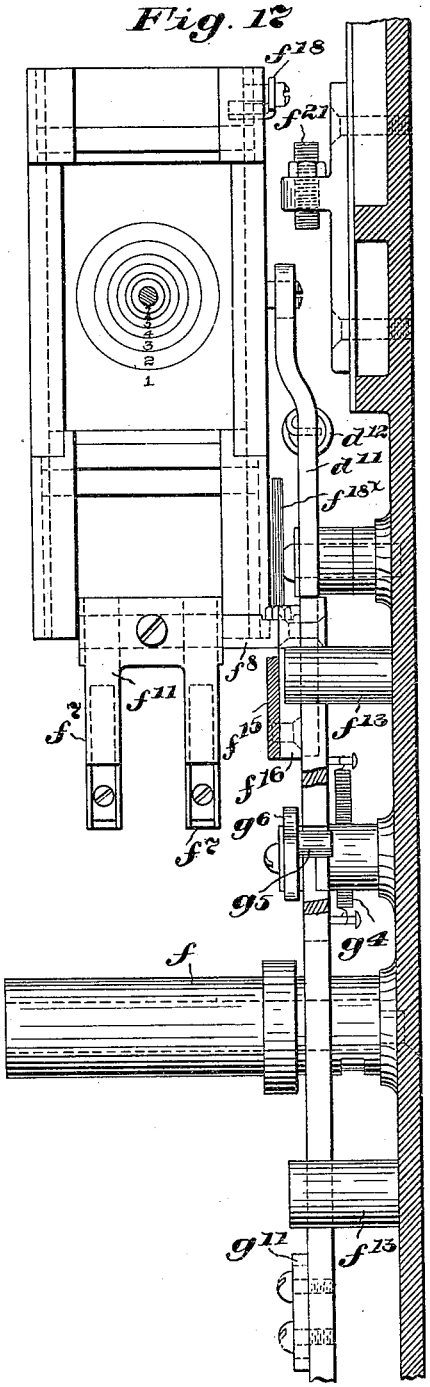

In the drawings,—Figure 1 is a side elevation of one form of my invention with the housing or casing partially removed to show the contained parts; Fig. 2 is a sub- or miniature target upon which the aim is recorded; Figs. 3 and 4 are details in plan and elevation, respectively, of a portion of the target holder bracket; Fig. 5 is a plan view partially broken away, of the follower parts and the recording mechanism; Fig. 6 is an elevation of the operating parts with the magazine holder removed; Fig. 7 is an enlarged detail plan view partially in section, with certain parts removed, showing the construction of the sub-target holder bracket, sub-target holder and their relation to the revolver arm; Fig. 8 is a section on the line 8—8, Fig. 7; Figs. 9 and 10 are details in plan and elevation, respectively, of the recording needle support; Fig. 11 is a detail of the follower connection; Figs. 12 and 13 are sections showing the sub-target moving mechanism in the uncocked and the cocked positions, respectively, of the revolver; Fig. 14 is an elevation, partially in section, of the sub-target feeding mechanism, looking from the left in Fig. 15; Fig. 15 is a side elevation of the sub-target feeding mechanism; Fig. 16 is a side elevation of the locking devices for locking the feeding mechanism; Fig. 17 is an end elevation, partially in section, looking toward the left in Fig. 16; and, Fig. 18 is a detail in end elevation of the tilting frame stop screw.

Referring to Fig. 1, I have shown a coin controlled target practice apparatus having an aiming device, such as the revolver A, provided with the rearwardly extending arm $a$ secured to the revolver butt. The said arm is provided (Figs. 7 and 8) with rearwardly extending ears $a'$ mounted upon the horizontal trunnions $a^2$, secured to the support B, which herein is formed by a bent strip of metal (Figs. 6 and 8), swingingly mounted upon the vertical pivots $b$, thereby to provide a free universal aiming movement for the revolver, which latter may be grasped by the marksman and aimed at a distant target. The vertical pivot screws $b$ are secured to and within the casing C, and the latter may be carried upon a standard of suitable height or any other desired support, such standard being indicated at D, Fig. 1. The revolver is ordinarily held (Figs. 1 and 6) from aiming movement by the spring latch $a^3$ engaging the catch $a^4$, said latch having a releasing finger $a^5$ pressed against the lower side of the resetting rod $a^6$, which latter resets the recording devices and connects the target actuator $a^7$ (Figs. 8 and 12) with the revolver hammer $a^8$ (Fig. 1), with which and the trigger $a^9$ the revolver is provided, although in other respects it may be either a dummy or an actual firearm. The retractile spring $a^{10}$ (Figs. 1 and 13), secured to the arm $a$ tends normally to draw the actuator $a^7$ forward to seat the revolver hammer $a^8$. When the revolver is cocked the rod $a^6$ forces the actuator $a^7$ backward and the finger $a^5$ downward, the latter releasing the latch $a^3$; free aiming movement being then permitted until the trigger is pulled to release the hammer and the resetting rod, when the latch $a^3$ again snaps under the catch as soon as the revolver is depressed or dropped. Connected (Figs. 5 and 6) to follow the movement of the revolver is the rearwardly extending follower rod $c$, adjustably secured at its rear end (Figs. 5 and 11) to the bent finger $c'$. The bend in the latter underlies the rearwardly projecting shank of the recording needle $c^2$, the latter being also capable of universal movement and, for that purpose, having (Figs. 5, 9 and 10) a spherical bearing $c^3$ seated between the removable cap $c^4$ and the bracket $c^5$, the latter secured to the lug $c^6$ on the casing C. To connect the follower rod $c$ with the revolver, the former is adjustably and removably secured (Figs. 7 and 12) at its forward end to a tilting frame $c^7$, the latter being pivotally secured by the pivot screws $c^8$ to the arm $a$. The frame $c^7$ is provided with an adjustable distance pin $c^9$, which is held to a seat against the arm $a$ when the revolver is raised by the tension spring $c^{10}$ (Fig. 12) secured to a lug $c^{11}$ on the under side of the arm $a$. The tilting frame $c^7$ is provided (Fig. 5) with a stop screw $c^{12}$, which seats (Fig. 18) against the stationary casing ledge $c^{13}$ when the revolver is lowered and locked, the arm $a$ being then withdrawn from the distance pin $c^9$. When the revolver is raised for aiming, the pin $c^9$ again seats itself against the arm $a$ and, being held in contact therewith by the spring $c^{10}$, the tilting frame and follower rod are caused correctly to transmit the aiming movement through the finger $c'$ to the needle $c^2$. During all movements of the follower rod, the needle is caused to remain seated in the bend of the finger $c'$ by the tension spring $c^{14}$, and the needle point, therefore, reproduces with reference to any stationary object, as the secondary or sub-target here employed, the exact aiming movement of the revolver relatively to the main target, although herein in increased ratio. The sub-target E (Fig. 7) is secured in a suitable target holder F to face the point of the needle, and at the time of simulated firing, is forced against the needle point, as hereafter described, to permanently record the position of the needle and therefore the aim of the revolver at that time.

In order to limit the range of needle movement approximately to the face of the target while permitting excess movement of the revolver when desired, the needle is caused to pass through (Fig. 5) a limiting frame $c^{15}$, secured to the bracket $c^5$ and thereby to have its movement limited when the revolver undergoes excessive deflection, the yielding connection between the needle and the revolver permitting this excess movement of the latter over the former. Thus, any excessive upward deflection of the revolver temporarily withdraws the finger $c'$ from the needle shank, when the latter meets the limiting walls of the frame $c^{15}$. Excessive downward deflection permits first a withdrawal of the arm $a$ from the frame $c^7$, as the stop screw seats itself against the casing ledge $c^{13}$, and thereby relieves the follower parts from the strain of the tension spring $c^{10}$. If the revolver is lowered below this point, the pivotal connections $c^8$ between the frame and the revolver being also depressed, subsequent lowering of the revolver acts to lower the previously raised rear end of the follower $c$ and raise the previously lowered needle point to an approximate mid position, which therefore, is the needle position when the revolver is lowered and locked. Excessive lateral deflection of the revolver permits the temporary unseating of the needle shank from the bottom of the bend of the finger $c'$.

To effect initial adjustment of the follower connections of the apparatus the revolver is first accurately sighted at the bull's-eye of the main target and if necessary, the needle is then adjusted to point also to the bull's-eye of the sub-target, adjustments in a vertical plane being effected by the adjustable distance pin $c^9$ upon the tilting frame and in a horizontal plane by the adjustable connection between the bent finger $c'$ and the follower rod $c$.

The sub-target when in position (Figs. 7 and 15) is held in two parallel slots $d$ in the sub-target holder F, the latter herein comprising the holder frame $d'$, being preferably faced with a wall or pad $d^2$ of elastic material, such as rubber, to press the sub-target against the needle point when record is made. The holder frame $d'$, has projecting from its back the tubular stem $d^3$, adapted to slide in the guide supports $d^4$ and $d^5$, carried by the forked sub-target holder bracket $d^6$ (Fig. 7) which latter is secured to the side of the casing C. Projecting from the end of the holder stem is the target holder pin $d^7$, the extent of projection of the said pin from the end of the stem being accurately adjustable by means of the set screw $d^8$ and lock screw $d^9$, threaded into the stem from the face of the sub-target holder. The sub-target holder is provided (Figs. 14 and 16) with a laterally extending stud, $d^{10}$, acting within the forked end of the feed latching lever $d^{11}$, to cause the said lever to be moved with the holder, when the latter is forced toward the needle, against the tension of the sub-target holder spring $d^{12}$, said spring acting, therefore, in conjunction with the tension spring $d^{12x}$ attached to the opposite side of the target holder, to draw the latter toward the position shown in Fig. 13 maintaining the target holder pin $d^7$ in contact with the head of the hammer $d^{13}$, the latter being adjustably secured to the sub-target actuator $a^7$ as best shown in Figs. 12 and 13.

Referring to Figs. 12 and 13, the former of which shows in full lines the recording mechanism in the uncocked position of the revolver, the target hammer $d^{13}$ is held locked, and therefore likewise the revolver hammer and sub-target holder F, by the locking lever $d^{14}$, pivoted to the supporting guide $d^4$ and having its end overlying the hammer head to prevent movement thereof. Secured to the locking lever $d^{14}$ is a releasing rod $d^{15}$, the lower end of which (Fig. 6) at the bottom of the casing, is secured to one arm of the trip lever $d^{16}$, the opposite arm having an inturned end $d^{17}$, which normally lies across the coin slot $e$. When a coin is inserted in an opening (not shown) in the top of a casing, it enters a slot $e$, passes rearwardly, then downwardly, as shown in Fig. 6, and into an underlying coin receptacle, which may be a part of or within the pedestal D. On its passage, however, it trips the lever $d^{16}$ (see dotted lines, Fig. 6), lifts the rod $d^{15}$ and locking lever $d^{14}$, into the dotted line position (Fig. 12) and permits the swinging catch $d^{18}$ to swing beneath the tip of the locking lever, as shown by dotted lines (Fig. 12), thereby holding the mechanism unlocked ready for subsequent cocking. If the revolver is then cocked, the rod $a^6$ is pushed downward, throwing the actuator $a^7$ against the tension of spring $a^{10}$ to withdraw the sub-target hammer $a^{13}$ to the position in Fig. 13, displacing the pivoted catch $d^{18}$ and permitting the target-holder tension springs $d^{12}$ and $d^{12x}$ to draw the target holder to the position in Fig. 13 with the target holder pin $d^7$ seated against the hammer head. After the revolver has been aimed and the trigger pulled in the act of simulated firing, the target hammer $d^{13}$, thereby released is forced by the spring $a^{10}$ against the target holder pin $d^7$ to throw the holder with its contained sub-target toward the needle point. The momentum of the sub-target holder permits a slight overthrow beyond its normal position (Fig. 12) to cause the sub-target to meet the needle point and produce a permanent record of the revolver aim by the resultant puncture in the sub-target face, the holder thereafter being immediately retracted by the tension springs $d^{12}$ and $d^{12x}$ to the position shown (Fig. 12). When the revolver is fired and record effected the parts again assume the position in Fig. 12, and remain locked, as there shown, until another coin passes through the slot. After the record has been made the marked sub-target may be ejected from the apparatus and delivered to a position within the grasp of the operator by the following means, which suffice also to present in proper position a fresh sub-target for a new trial of marksmanship. A target holder or magazine G (Figs. 1, 14 and 15) is provided, of any suitable construction, but preferably in the form of a circular rotary holder having pockets for holding a supply of secondary or sub-targets in outwardly radiating positions. This holder is rotatively mounted upon a spindle $f$, to which it is secured by the wire clip $f'$, being given a constant rotative tendency in a right-handed direction (Fig. 6) by the weight $f^2$. The holder is so arranged (Figs. 14 and 15) that the faces of its radiating targets are brought successively (Fig. 15) against a pair of depending guide walls $f^3$, the side walls $f^4$ of which (Figs. 3 and 4) are secured to a shelf $f^5$. The latter is fastened to the bottom of the target holder support $d^4$ and is provided with guide-ways $h$, along which depending lips $h'$ on the target holder are adapted to slide, the said shelf $f^5$, therefore in coöperation with an upper shelf $f^6$, acting as additional guiding means for the target holder to prevent displacement thereof.

In the normal position of the target holder, the target receiving slots $d$ are directly in line (Figs. 3 and 4) with the slot formed between the beveled front face of the shelf $f^5$ and the guide walls $f^3$, so that a target may be lifted out of the holder by the pair of lifting fingers $f^7$ engaging the under exposed target edge and guided by the guide walls $f^3$ into its operative position within the slots of the holder $d'$. The lifting fingers $f^7$ are journaled (Figs. 14 and 15) on the pin $f^8$ rigidly secured to the vertical slide $f^9$ and are pressed toward the target to engage therewith by means of the spring $f^{10}$ between the said fingers and the block $f^{11}$, the latter rigidly secured to the pin. The slide $f^9$ rests in its lowermost position upon the stop $f^{12}$, but is slidable in the notched guiding pins $f^{13}$ and adapted to be raised by means (Fig. 5) of the exterior hand lever $f^{14}$ connected with the vertical slide through the arm $f^{15}$ and the link $f^{16}$, the tension spring $f^{17}$ acting to draw the slide and connected parts toward the position shown in Fig. 6. After firing and completion of the record, the lever $f^{14}$ is depressed to raise the fingers $f^7$, which are initially in the position shown in Fig. 15. The fingers in rising catch the lower edge of the sub-target next adjacent the guide $f^3$, and, moving to the position shown in dotted lines in Fig. 15, force the fresh target into the holder, the entering target pushing the preceding one out of the holder through slots formed between the beveled front lip of the upper shelf $f^6$ and upper guide walls $f^{17\times}$ secured to said shelf and of a shape similar to the lower guide walls $f^3$.

In order to prevent any movement of the revolver, after firing, from displacing the target holder from its normal position and disturbing the alinement thereof with the feeding slots formed by the guide walls, the spherical target hammer head, when the revolver is uncocked, is concentric with the center of revolver gyration, that is, at the intersection of its horizontal and vertical pivotal axes. Therefore, any movement of the revolver when uncocked, cannot displace the sub-target holder to interfere with the introduction and ejection of the sub-targets should feeding be attempted while the revolver is still held in the hand.

In Fig. 15 the target E' indicates the position assumed after expulsion from the holder, an overthrow of the ejected target beyond this position being prevented by the movement of the pivoted clamp $f^{18}$, which, on completion of the target feed, is momentarily pressed against the back of the target by engagement between a projecting lug on said clamp and an upwardly projecting rod $f^{18\times}$. The latter is secured to a flattened face of the pin $f^8$ and, rises with the slide $f^9$ to engage the clamp $f^{18}$ in the highest position of said slide when the new target is fully seated in the holder. The upper end of the expelled target is caused to project (Fig. 6) through a slot $f^{19}$ in the top of a casing and may be manually withdrawn by the marksman on the return of the slide $f^9$ and the release of the clamp $f^{18}$, the return of the slide being caused by the pull of the spring $f^{17}$ on release of the lever $f^{14}$. A pivoted protecting plate $f^{20}$ having a serrated edge rests against the back of the ejected target E' and, when the latter is withdrawn, drops against the guides $f^{17\times}$ to prevent injury to the apparatus which might be caused by the wilful introduction of foreign matter through the slot $f^{19}$. On the withdrawal of one target from the holder as described, the weight $f^2$ turns the target magazine G to bring the next succeeding target into feeding position against the face of the guide $f^3$.

In order to prevent an incomplete cycle of operations of the target feeding apparatus which might occur were the slide $f^9$ only partially raised, as by a partial depression only of the hand lever $f^{14}$, and therefore to compel the completion of the feeding movement when once begun, I have provided means for preventing reverse movement of the feeding mechanism until the vertical slide has reached the limit of its upward stroke and for preventing any further upward movement after its downward stroke has begun.

Referring to Figs. 14 to 17, inclusive, the slide $f^9$ is provided with a series of ratchet teeth $g$, which engage the pawl $g'$ on upward movement and the pawl $g^2$ on downward movement. The said pawls are pivoted for independent movement upon the pin $g^3$, fixed to the casing, but are normally drawn together by the spring $g^4$, toward the full line position shown in Fig. 16, where their adjacent sides are pressed against an intervening pin $g^5$, carried by the pawl arm $g^6$. The pawl arm $g^6$ has a notched end, against which rests the stationary leaf spring $g^7$, thereby holding the arm in one of the two positions shown in Fig. 16. When the revolver is locked and uncocked, awaiting insertion of a coin, the feed locking parts are in the full line position shown in Fig. 16, where the pawl $g^2$ engages with and prevents an upward or feeding movement of the slide $g^9$. When the revolver is cocked, the latch lever $d^{11}$ is thrown to the dotted line position, where a lug $g^8$ at the bottom thereof enters a notch $g^9$ in the edge of the slide and prevents feeding movement thereof. Simultaneously, the tip $g^{10}$ of the said lever moves against the pawl $g'$ to force the pawl lever $g^6$ through the pin $g^5$ from the full line position to dotted line position shown, the spring $g^7$ completing the movement of the pawl lever and temporarily retaining it in the dotted line position. The movement of the lever $g^6$ throws the pawl $g'$ into, and the pawl $g^2$ out of engagement with the slide $f^9$. When the revolver has been fired, the lug $g^8$ on the feed latching lever is withdrawn entirely from the notch $g^9$, and the slide is then free to be raised by the operating handle $f^{14}$ to feed a fresh target and eject the preceding one. When the slide $f^9$ reaches the upper limit of movement, which is determined by the adjustable stop screw $f^{21}$, the stop $g^{11}$ on the slide $f^9$ engages with and throws the pawl lever $g^6$ back to the full line position (Fig. 16) thereby throwing the pawl $g'$ out of, and the pawl $g^2$ into engagement with the ratchet teeth, permitting downward movement of the feeding mechanism, and downward movement only, to follow. Thus it will be seen that at no position in its movement is the feeding slide $f^9$ capable of a retrograde movement; but the feeding operation once begun, must be completed. It will also be noted that the feeding operation is not possible until completion of firing and that but one sub-target can then be fed.

When in operation the casing C suitably supported, is arranged with reference to a main target so that the revolver may be aimed thereat. A standard target may be used at the standard distance, or, if desired, the same may be proportionately reduced. The sub-target is preferably a reproduction of the main target, but appropriately reduced. The apparatus being locked as shown in Fig. 1, a coin is inserted in the slot, causing release of the locking lever $d^{14}$. The revolver may then be cocked, which causes the release of the latch $a^8$ between the instrument for aiming purposes and further sets the recording devices in the position shown in Fig. 13. As the marksman now aims at the main target the needle correctly reproduces with reference to the adjacent sub-target the direction of the trajectory of the revolver with reference to the main target. When the trigger $a^9$ is pulled, the target holder is thrown to press the sub-target against the needle point to record the needle position, and consequently the revolver aim. The feeding mechanism being simultaneously unlocked by movement of the feed locking lever $d''$. The operating lever $f^{14}$ may now be moved to eject the punctured sub-target into the position shown in Fig. 6 and to substitute for the ejected target a fresh one from the target magazine in preparation of a repetition of the trial of marksmanship. If desired, the same target may be employed to receive two or more records before being ejected by the operation of the feeding mechanism and in order that the marksman after firing may see the record of his aim without ejecting the target, I preferably employ the glass wall H through which the target may be seen.

It will be obvious that my invention is in no respect limited to the details herein shown, or to the form and arrangement of parts, the same being here selected and described in detail for the sole purpose of disclosing one practical embodiment of my invention. It is to be understood that the latter is capable of embodiment in many other forms unnecessary to describe, and moreover that various individual features herein described are capable of use in other combinations and other connections unnecessary here to refer to.

Claims.

1. A target practice apparatus employing an aiming device capable of simulated firing and a sub-target, reciprocatory target feeding means, and means for preventing feeding until after the simulated firing.

2. In a target practice apparatus of the class described, the combination with an aiming device of recording mechanism, the same including a target hammer normally concentric with the center of gyration of said aiming device.

3. In a target practice apparatus of the class described, the combination with an aiming device, of recording mechanism, including a movable target holder having a target pin and a target hammer for actuating the same, the latter being normally concentric with the center of gyration of said aiming device.

4. In a target practice apparatus, of the class described, a casing having an inner ledge $c^{13}$, a gyratory arm $a$, a tilting frame, $c^7$, mounted thereon, provided with a stop screw $c^{12}$ adapted to engage said casing ledge $c^{13}$ and limit the movement of said frame, while permitting excessive and further movement of said arm relative thereto.

5. In a target practice apparatus of the class described, a target holder having a target pin $d^7$ adjustably mounted thereon and a target hammer for actuating the same.

6. In a target practice apparatus of the class described, an aiming device, a gyratory arm on which said aiming device is mounted, mechanism on said aiming device adapted to be set preparatory to use, a resetting rod connected therewith, and a target hammer movable therewith, having an adjustable hammer head.

7. In a target practice apparatus of the class described, a pivoted target actuator, $a^7$, having a curved head $d^{13}$, and means for adjusting the position of the same upon said actuator.

8. In a target practice apparatus of the class described, an aiming device having firing mechanism adapted to be set preparatory to use, a target holder for holding a target, means for recording the aim of the aiming device thereon, target feeding means for supplying targets to said holder and for partially ejecting the one upon which a record has been made, and means connected with said holder for preventing total ejectment of said target, said target feeding means being inoperative prior to firing and production of a record on the target in operative position.

9. In a target practice apparatus of the class described, an aiming device, a target holder operatively connected therewith, target feeding means therefor, including a slide $f^9$ having a notch $g^9$ and a latch lever, $d''$, movably connected with and actuating said holder upon simulated or actual firing, said latch lever having a lug, $g^8$, normally to engage said notch $g^9$ to prevent feeding movement of said slide prior to movement of said holder.

10. In a target practice apparatus, the combination with an aiming device having an arm $a$, the tilting frame $c^7$ attached thereto, but movable with relation thereto, the recording needle $c^2$ movable with the frame, and the casing ledge $c^{13}$ to limit the movement of the frame.

11. In an apparatus of the class described the combination with an aiming device and follower means, of target feeding mechanism comprising a feeding member, a reciprocatory ratchet slide attached thereto, and stationarily pivoted pawl mechanism engaging said ratchet.

12. In an apparatus of the class described the combination with an aiming device and follower means, of target feeding mechanism comprising feeding devices and controlling means therefor, including a ratchet, a pair of pawls adapted for alternate engagement therewith, one of said pawls opposing relative movement between the same and the ratchet in one direction and the other pawl in the opposite direction, and means for throwing said pawls separately into engagement with said ratchet.

13. A target practice apparatus employing a target magazine, and reciprocatory target feeding mechanism, the latter having relatively movable ratchet and pawl devices, and additional locking means for locking said feeding mechanism against movement.

14. An apparatus of the class described employing an aiming device and follower means, the combination with target feeding mechanism having a reciprocatory member and means for moving a part into interlocking engagement with said reciprocatory member to prevent the movement thereof on preparation for firing.

15. In a target practice apparatus of the class described employing an aiming device, the combination with reciprocatory target feeding mechanism adapted to undergo a complete reciprocation on the feeding of each target, of ratchet and pawl mechanism for preventing retrograde feeding movement, said mechanism employing a pair of pawls adapted one for engagement with the ratchet to prevent its movement in one direction and the other for separate engagement to prevent its movement in the opposite direction, means to place the appropriate pawl in engagement at the completion of the half reciprocation of said mechanism to permit the return feeding movement, said pawl being left in engagement to prevent further feeding movement, means rendered operative on preparation to use said aiming device, for disengaging said first pawl from and engaging said other pawl with said ratchet and also to positively lock the feeding mechanism against movement and means acting on simulated or other firing of said aiming device to unlock the feeding mechanism for feeding.

16. In a target practice apparatus of the class described employing an aiming device, the combination with reciprocatory target feeding mechanism adapted to undergo a complete reciprocation on the feeding of each target, of ratchet and pawl mechanism for preventing retrograde feeding movement, said mechanism employing a pair of pawls adapted one for engagement with the ratchet to prevent its movement in one direction and the other for separate engagement to prevent its movement in the opposite direction, means to place the appropriate pawl in engagement at the completion of the half reciprocation of said mechanism to permit the return feeding movement, said pawl being left in engagement to prevent further feeding movement, and means rendered operative on preparation to use said aiming device for disengaging said first pawl from and engaging said other pawl with said ratchet.

17. In a target practice apparatus of the class described, employing an aiming device, the combination with reciprocatory target feeding mechanism adapted to undergo a complete reciprocation on the feeding of each target, of ratchet and pawl mechanism for preventing retrograde feeding movement, said mechanism employing a pair of pawls adapted one for engagement with the ratchet to prevent its movement in one direction and the other for separate engagement to prevent its movement in the the opposite direction, and means for placing the appropriate pawl in engagement with the ratchet prior to feeding movement in the forward or return directions.

18. In a target practice apparatus of the class described the combination with an aiming device and aim recording means, of reciprocating target feeding mechanism adapted to undergo complete reciprocation on the feeding of each target, mechanism for preventing retrogression on the forward feeding movement, means for shifting said mechanism at the completion of the forward feeding movement or preventing retrogression on the return feeding movement, said mechanism being left at the completion thereof in position to prevent further feeding movement, and means rendered operative in preparation for using said aiming device to shift said mechanism to permit repetition of the said feeding movement.

19. In a target practice apparatus of the class described, the combination with an aiming device and aim recording means, of reciprocating target feeding mechanism adapted to undergo complete reciprocation on the feeding of each target, mechanism for preventing retrogression on the forward feeding movement, means for shifting said mechanism at the completion of the forward feeding movement or preventing retrogression on the return feeding movement, said mechanism being left at the completion thereof in position to prevent further feeding movement, means rendered operative in preparation for using said aiming device for shifting said mechanism to permit aiming movement and also simultaneously to lock positively the feeding mechanism against movement, and means acting on simulated or other firing of said aiming device to unlock the feeding mechanism.

20. In an apparatus of the class described, employing an aiming device and aim recording means, the combination with reciprocatory target feeding mechanism, of means rendered operative preparatory to using said aiming device for positively locking said mechanism against feeding movement, and means acting on a simulated or other firing to unlock the same.

21. In an apparatus of the class described, employing an aiming device and aim recording means, the combination with reciprocatory target feeding mechanism, a movable target holder and locking means for said feeding mechanism operatively connected with the target holder.

22. In an apparatus of the class described the combination with the aiming device A, the feeding slide $f^9$, ratchet teeth $g$, and the pawls $g'$ and $g^2$, engaging the teeth and coöperating therewith to govern the movement of the slide.

23. In an apparatus of the class described the combination with the aiming device A, the feeding slide $f^9$, the ratchet teeth $g$, pawls $g'$ and $g^2$ and the latch lever $d''$ all coöperating to govern the movement of the slide.

24. In an apparatus of the class described, the combination with the aiming device A, feed slide $f^9$, latch lever $d''$ and the target holder F coöperating to hold the slide locked.

25. In an apparatus of the class described, the combination with the aiming device A, feed slide $f^9$, having the pivoted lifting fingers $f^7$, and means connected therewith for reciprocating said slide, ratchet teeth $g$ on said slide, the pivoted pawls $g'$, $g^2$, and connected pawl arm $g^5$, and the coöperating spring $g^7$ for holding the pawls in either of two positions to which they are moved by the feeding movement of said slide.

In testimony whereof, I have signed my name to this specification, in the presence of two subscribing witnesses.

HENRY H. CUMMINGS.

Witnesses:
 THOMAS B. BOOTH,
 EVERETT S. EMERY.